(12) United States Patent
Miller et al.

(10) Patent No.: US 7,601,222 B2
(45) Date of Patent: Oct. 13, 2009

(54) SINGLE ITEM WORKFLOW MANUFACTURING SYSTEM AND METHOD

(75) Inventors: Richard H. Miller, Rose Hill, KS (US); Ronald E. Jones, Conway Springs, KS (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 10/948,136

(22) Filed: Sep. 24, 2004

(65) Prior Publication Data

US 2006/0070225 A1    Apr. 6, 2006

(51) Int. Cl.
*B05C 3/00* (2006.01)

(52) U.S. Cl. .............................. 118/423; 118/73; 118/66

(58) Field of Classification Search ................ 118/423, 118/70, 66, 72–74; 29/430, 431, 458, 783, 29/791, 709, 711; 72/46–47, 129–132, 338–339
See application file for complete search history.

(56) References Cited

U.S. PATENT DOCUMENTS

| | | | | |
|---|---|---|---|---|
| 1,588,768 | A * | 6/1926 | Moulton | 65/61 |
| 3,011,914 | A * | 12/1961 | Pflug | 427/335 |
| 3,707,087 | A * | 12/1972 | Neilsen | 72/429 |
| 3,880,631 | A * | 4/1975 | Ripley | 65/30.14 |
| 4,008,031 | A * | 2/1977 | Weber | 425/567 |
| 4,772,374 | A * | 9/1988 | Urquhart et al. | 204/625 |
| 5,143,101 | A * | 9/1992 | Mor | 134/58 R |
| 5,356,503 | A * | 10/1994 | Caryford et al. | 156/272.2 |
| 5,615,588 | A * | 4/1997 | Gottschald | 82/11 |
| 6,013,308 | A * | 1/2000 | Saito | 427/8 |
| 6,296,707 | B1 * | 10/2001 | Adamczyk et al. | 118/668 |
| 6,355,104 | B1 * | 3/2002 | Polster | 118/666 |
| 6,419,748 | B1 * | 7/2002 | Kaneko | 118/424 |
| 6,539,957 | B1 * | 4/2003 | Morales, Jr. | 134/95.2 |
| 6,948,749 | B2 * | 9/2005 | Graber | 293/102 |

OTHER PUBLICATIONS

MCP Chemicals—Equipment—Process Technology for Metal Finishing; The MCP System of Electropolishing: An Overview; 8 pages; undated document.

* cited by examiner

*Primary Examiner*—Brenda A Lamb

(57) ABSTRACT

In a system for manufacturing a part, a first forming station forms the part from a supply of material. A chemical processing system chemically alters a surface of the part. The chemical processing system includes a tank, parts rotator, circulation system, and control system. The tank includes a chemical side and a rinse side. The chemical side includes a chemical solution and the rinse side includes a sprayer to spray a rinse solution on the part. The parts rotator assembly moves relative to the tank. The circulation system circulates fluid in the tank. The control system receives signals from a sensor and modulate the system in response to the signals. Additionally, in the system, a finishing station applies a finish to the item.

3 Claims, 9 Drawing Sheets

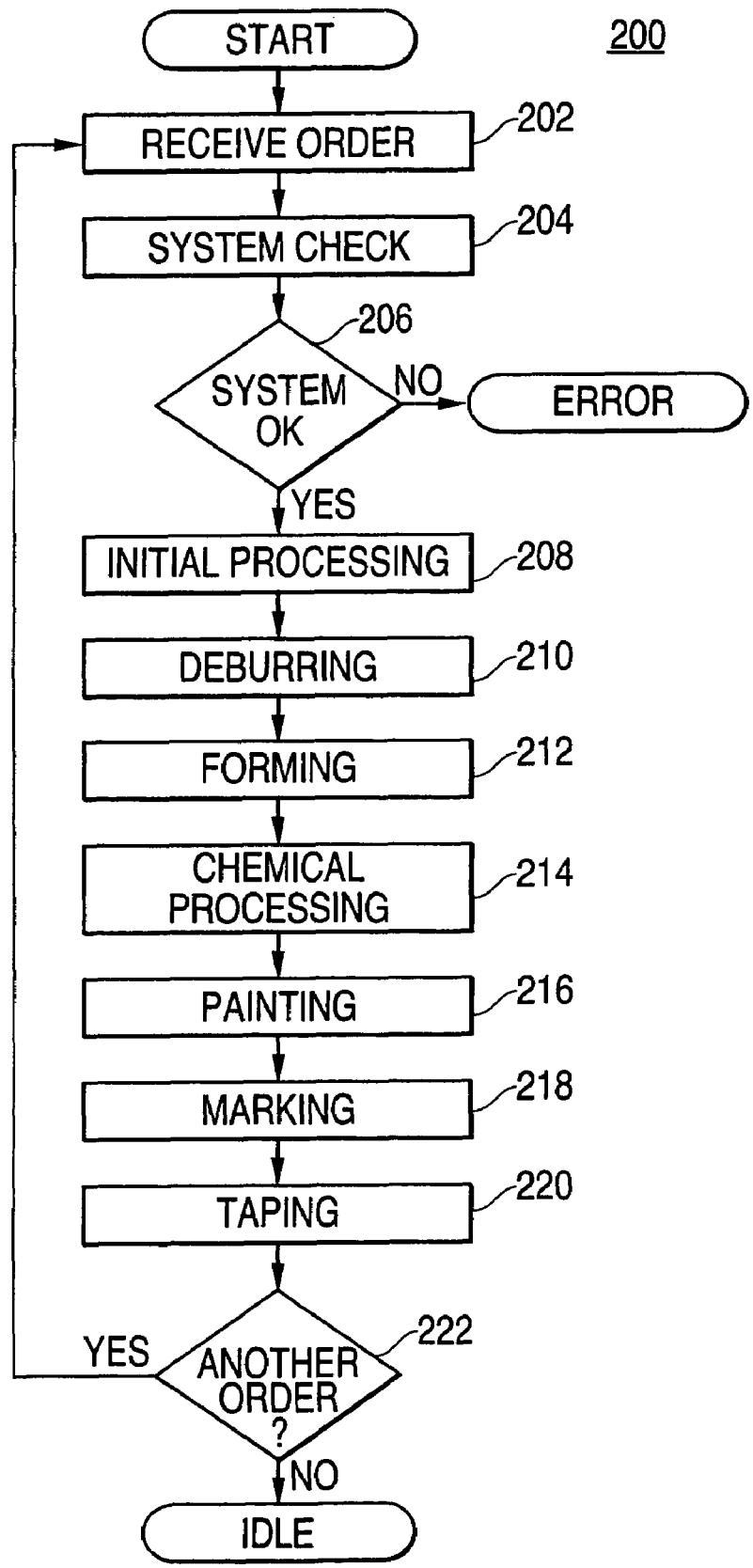

SINGLE ITEM WORKFLOW MANUFACTURING SYSTEM AND METHOD

CROSS-REFERENCE TO RELATED APPLICATIONS

This application claims priority to U.S. patent application entitled, CHEMICAL PROCESSING METHOD AND SYSTEM, filed Sep. 14, 2004, having inventors Richard H. MILLER and Ronald E. JONES, the disclosure of which is hereby incorporated by reference in its entirety.

FIELD OF THE INVENTION

The present invention generally relates to the manufacture of items. More particularly, the present invention pertains to a device and system for manufacturing items in a single piece workflow and a method of use.

BACKGROUND OF THE INVENTION

The manufacture of items generally involves a multitude of steps or processes to take the item or part from raw materials to finished part. The particular processes vary from one industry to the next and according to the materials used. However, there are some processes that cut across multiple industries. For example, forming, preparation, and finishing processes are typically utilized in the manufacture of plastic and metal items. In addition, each process typically entails more than one step. More specifically, in the manufacture of metal parts, forming the part involves preparing the raw materials and casting, forging, rolling, and/or stamping the item. Subsequently, the item is prepared for finishing. For example, sprue is removed from cast items, rolled and stamped items are cleaned and degreased, and the like. More particularly, chemical processing is widely utilized in the metal part fabrication industry to prepare and/or finish the part. Broadly, these chemical processes include: cleaning, de-greasing, etching, deoxidizing, reducing, chemical deposition, and the like. These processes are similar in that they generally involve immersing or otherwise coating a fabricated part in a chemically reactive solution. Typically, a large batch of parts are dipped into a tank, held in the tank for some length of time and then rinsed and/or moved to another tank of some other chemically reactive solution.

A disadvantage associated with conventional metal part fabrication is that parts are processed in a "batch and queue" manner. That is, some steps involve machines that do not lend themselves to batch processing. Thus, parts queue up as they are processed one or a few at a time. However, other steps are preformed in great batches. For example, conventional chemical processing systems are generally designed for batching hundreds or thousands of parts through the process. In addition, chemical processing tanks are typically located in a separate facility away from the fabrication process. The tanks are typically large, e.g. a 20,000 gallon capacity, and do not lend themselves to producing a flow of single work pieces. These and other factors lead to large investments of time and materials prior to the production of a first part. Lead time between batches is also quite large and, if a faulty batch is produced or production is stopped while a batch is in process, a great deal of materials are wasted.

Accordingly, it is desirable to provide a device and system for manufacturing items and a method of use that is capable of overcoming the disadvantages described herein at least to some extent.

SUMMARY OF THE INVENTION

The foregoing needs are met, to a great extent, by the present invention, wherein in some embodiments a device and system for manufacturing items and a method of use is provided.

An embodiment of the present invention relates to a system for manufacturing a part. The system includes a first forming station, a chemical processing system, and a finishing station. The first forming station forms the part from a supply of material. The chemical processing system chemically alters a surface of the part. The chemical processing system includes a tank, parts rotator, circulation system, and control system. The tank includes a chemical side and a rinse side. The chemical side includes a chemical solution and the rinse side includes a sprayer to spray a rinse solution on the part. The parts rotator assembly moves relative to the tank. The circulation system circulates fluid in the tank. The control system receives signals from a sensor and modulate the system in response to the signals. The finishing station applies a finish to the part.

Another embodiment of the present invention pertains to a system for processing an order of a plurality of items. The system including a forming station, chemical processing system, and finishing station. The forming station forming the plurality of items in a single piece workflow in response to the order. The chemical processing system receiving the plurality of items in the single piece workflow and chemically altering the plurality of items in the single piece workflow. The finishing station applying a finish to the item in the single piece workflow.

Yet another embodiment of the present invention relates to an apparatus for manufacturing a part. The apparatus includes a means for forming the part from a supply of material and a means for chemically processing the part. The means for chemical processing includes a means for attaching the part to a parts rotator assembly, a means for dipping the part in a chemical bath at a first end of the chemical bath, and a means for advancing the part through the chemical bath. In addition, the means for chemically processing includes a means for raising the part over a divider in response to the part reaching a second end of the chemical bath, a means for advancing the part past the divider in response to the part being sufficiently high to clear the divider, and a means for lowering the part into a rinse side in response to the part advancing sufficiently. The apparatus further includes a means for applying a finish to the part.

Yet another embodiment of the present invention pertains to a method of manufacturing a part. In this method, the part is formed from a supply of material and the part is chemically processed. In the chemical processing of the part, the part is attached to a parts rotator assembly, the part is dipped in a chemical bath at a first end of the chemical bath, and the part is advanced through the chemical bath. In addition, the part is raised over a divider in response to the part reaching a second end of the chemical bath, the part is advanced past the divider in response to the part being sufficiently high to clear the divider, and the part is lowered into a rinse side in response to the part advancing sufficiently. Furthermore, in the method of generating the part, a finish is applied to the part.

Yet another embodiment of the present invention relates to a method of manufacturing an order of a plurality of items. In this method, the plurality of items is formed in a single piece workflow in response to the order. The plurality of items is chemically processed in the single piece workflow. A finish is applied to the plurality of items in the single piece workflow.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 9 is a flow diagram of a method of use according to the system of FIG. 1.

DETAILED DESCRIPTION

The present invention provides, in some embodiments, an item manufacturing system and a method of manufacturing items. In an embodiment, the invention provides an item manufacturing system for manufacturing various items or parts. Advantages of certain embodiments of the item manufacturing system include one or more of: processing a flow of single items; portability; flexibility, use with existing power supply; and the like. As a result of these advantages, the item manufacturing system may generate a finished item from raw materials in a relative compact space and in a relatively short amount of time as compared to conventional manufacturing systems.

In addition, the item manufacturing system is readily adaptable to changes in processing procedures. In this regard, manufactured items or parts are often chemically processed to improve certain characteristics of the item. Examples of characteristics improved by chemical processing include: wear resistance; resistance to corrosion; surface hardness; coating adhesion; and the like. Depending upon the particular processing being performed, the item is subjected to one or more chemical solutions for a predetermined amount of time and at a predetermined temperature. Due to the flexibility and portability of subunits that make up the item manufacturing system, the item manufacturing system may be reconfigured with comparative ease. For example, if, during production, an additional chemical treatment of the item becomes necessary, an additional chemical processing subunit of the item manufacturing system may be integrated. In a conventional system, such a change may require comparatively major re-design and re-tooling.

Figure 1:
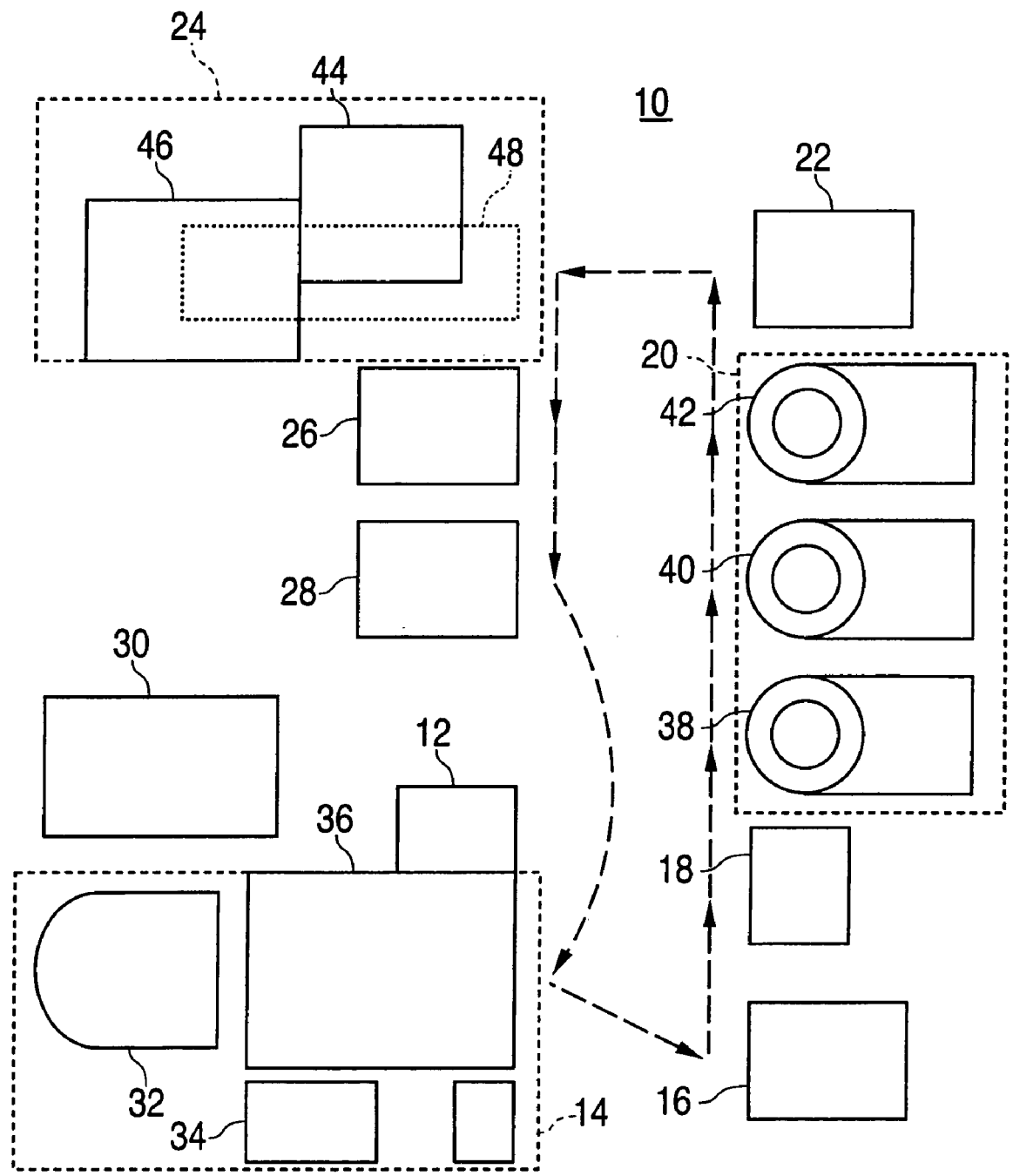
FIG. 1 is block diagram of a manufacturing system according to an embodiment of the invention.

The invention will now be described with reference to the drawing figures, in which like reference numerals refer to like parts throughout. As shown in FIG. 1, an item manufacturing system ("IMS") 10 includes an order management station 12, initial fabrication station 14, deburring station 16, forming station 18, chemical processing system 20, drying station 22, painting system 24, marking station 26, taping station 28, and power supply 30.

The order management station 12 is configured to receive orders for items, maintain an inventory of raw materials, and the like. For example, the order management station 12 receives orders for items utilized to construct a device such as an aircraft. In particular, a Boeing® 737-900 plane includes approximately 550 sound dampening ladders. During production of the plane, the order management station 12 receives an order for some or all of the sound dampening ladders. The order management station 12 is further configured to compare the order to an "on hand" inventory of raw materials. An example of raw materials includes: 0.020" thick T3 aluminum clad sheet in roll form; sanding drums; cleaning solution; de-oxidation solution, Alodine 600™ solution; rinse solution; paint; ink; tape; and the like. The order management station 12 is further configured to order additional raw materials in response to the on hand raw materials being insufficient to generate the order and/or insufficient to generate projected orders.

The initial fabrication station 14 includes a decoiling unit 32, feed unit 34, and punch/trim unit 36. The decoiling unit 32 is configured to essentially straighten raw materials supplied in roll form. Materials supplied in roll form include sheet and round stock. In general, the decoiling is accomplished by unrolling and bending the rolled stock a few degrees past dead flat. The amount of pressure, the bend rate, radius of the bend and other such parameters are based upon the particulars of the rolled material.

The feed unit 34 aligns and urges the stock into the punch/trim unit 36. For example, a pair of powered rollers are configured to grasp the stock (rolled materials) and feed it from the decoiling unit 32 to the punch/trim unit 36.

The punch/trim unit 36 is configured to cut a shape that generally corresponds to the desired item from the stock. Typically, the stock is disposed between a pair of dies and the dies are driven towards one another with sufficient force to shear undesired materials from the item. In addition, other material may be trimmed from the item and/or if multiple items are punched together, the items may be trimmed apart.

The deburring station 16 is configured to remove burrs or wire edges formed by the punching/trimming process. In addition, sharp edges may be chamfered or eased as appropriate for the item at the deburring station 16.

The forming station 18 is configured to bend and/or join the item as appropriate. For example, the forming station 18 may include a break or other such bending or folding device and a feed to position the item in the break. In another embodiment, the forming station 18 includes a spot welding, Metal Inert Gas ("MIG") welder, and/or Tungsten Inert Gas ("TIG") welder configured to join a plurality of parts together.

The chemical processing system 20 is configured to chemically alter or process at least a surface portion of the item. As shown in FIG. 1, the chemical processing system 20 includes a cleaning unit 38, deoxidation unit 40, and Alodine 600™ unit 42. For example, as any oil or other such film may adversely affect deoxidation and/or coating steps, the item is cleaned in the cleaning unit. To improve adherence of subsequent coatings, the item is deoxidized and/or chemically etched in the deoxidation unit 40. The Alodine 600™ unit 42 applies a proprietary coating on the item to improve chemical resistance of the underlying base metal and improve adhesion of subsequently applied paint. A more detailed description of the chemical processing system 20 is provided herein.

The drying station 22 is configured to evaporate or dry liquids such as water and/or rinse solution on the item. The drying station 22 may include a fan or blower and/or a heater to facilitate evaporation.

The painting system 24 includes a painting unit 44, curing oven 46, and cooling unit 48. The painting unit 44 is configured to coat the item with paint. In this regard, the painting unit 44 includes a paint spraying or dipping device. The painting unit 44 is further configured to apply one or a few coats of paint as appropriate. In addition, the painting unit optionally includes an air knife to remove undesirably large accumulations of paint.

The marking station 26 is configured to label the item. Information included in the label includes one or more of: a unique identification, item number, date/time stamp, and the like. These markings may be applied in any suitable manner. Suitable examples of marking methods include printing, labeling, engraving, stamping, and the like.

Optionally, the taping station 28 is configured to apply sound deadening tape upon the item. For example, parts to reduce noise and/or vibration may, optionally, have sound deadening tape applied.

The power supply 30 is configured to provide power to the various other units of the IMS 10. The power supply 30 is further configured to provide power in any suitable form. For example, the punch/trim unit 36 may utilize 3 phase, 480 volt, alternating current while the painting unit 44 utilizes single phase, 120 volt, alternating current and/or pressurized air.

In the following description of FIGS. 2-7, a particular example is made of the chemical processing system 20 according to an embodiment of the invention. However, for the purpose of brevity, the descriptions of the other units of the IMS 10 will not be described in such detail.

Figure 2:
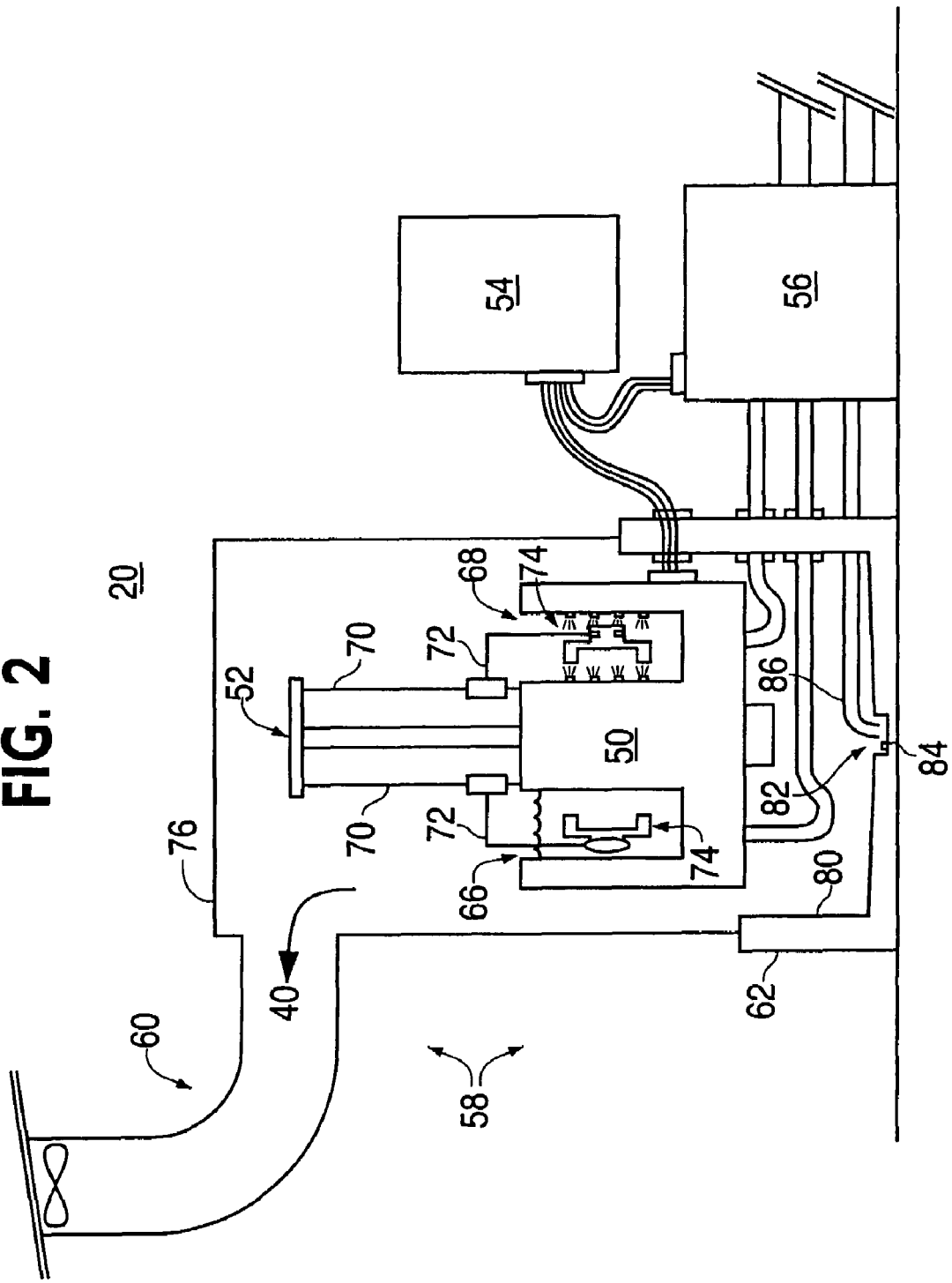
FIG. 2 is simplified view of a chemical processing system according to the system of FIG. 1.

As shown in FIG. 2, a chemical processing system 20 includes a tank 50, parts rotator assembly 52, control system 54, circulation system 56, and a containment system 58 which includes a fume control system 60, and spill control system 62.

As shown in cross section in FIG. 2, the tank 50 is generally toroid or donut shaped. The tank 50 includes one or more areas separated by tank dividers 64 (shown in FIG. 3). In a particular example, the tank 50 includes two areas: a chemical side 66 and a rinse side 68. According to various embodiments, the tank 50 includes any suitable number of areas. In general, each chemical bath area includes an associated rinse area and thus, the number of areas is typically a multiple of two such as, for example 2, 4, 6, 8 and the like. However, the tank 50 according to other embodiments includes an odd number of areas.

The parts rotator assembly 52 includes plurality of rods 70 upon which a plurality of respective part holders 72 ride. Each part holder 72 is configured to detachably secure a respective item 74. The parts rotator assembly 52 is configured to rotate relative to the tank 50 and thereby progress the items in a single workpiece flow through the areas of the tank 50.

In general, the control system 54 is configured to control the various subsystems of the chemical processing system 20. More particularly and as described in greater detail herein, the control system 54 is configured to maintain preset temperatures travel rates, and flow rates based on inputs from a variety of sensors. Also described in greater detail herein, the circulation system 56 is modulated by the control system 54 to provide chemical and rinse solution and remove waste fluids.

The containment system 58 is configured to substantially prevent chemicals within the chemical processing system 20 from escaping into the surrounding environment. In particular, the fume control system 60 includes an envelope 76 to arrest any vapors or liquids. In addition, a vent 78 is configured to vent any gasses from the envelope 76 and maintain a lower pressure within the envelope relative to ambient pressure. Vapors removed from the envelope 76 are filtered and/or exhausted as appropriate. The spill control system 62 includes a barrier 80 and a sump 82. The barrier 80 is configured to provide sufficient volume to contain a failure of the tank 50. The sump 82 is configured to collect and dispose of a relatively minor spill. In this regard, the sump 82 is disposed at a relatively low spot of the barrier 80. The sump 82 further includes a sensor 84 to sense liquid and a sump pump intake 86 to withdraw the sensed liquid.

Figure 3:
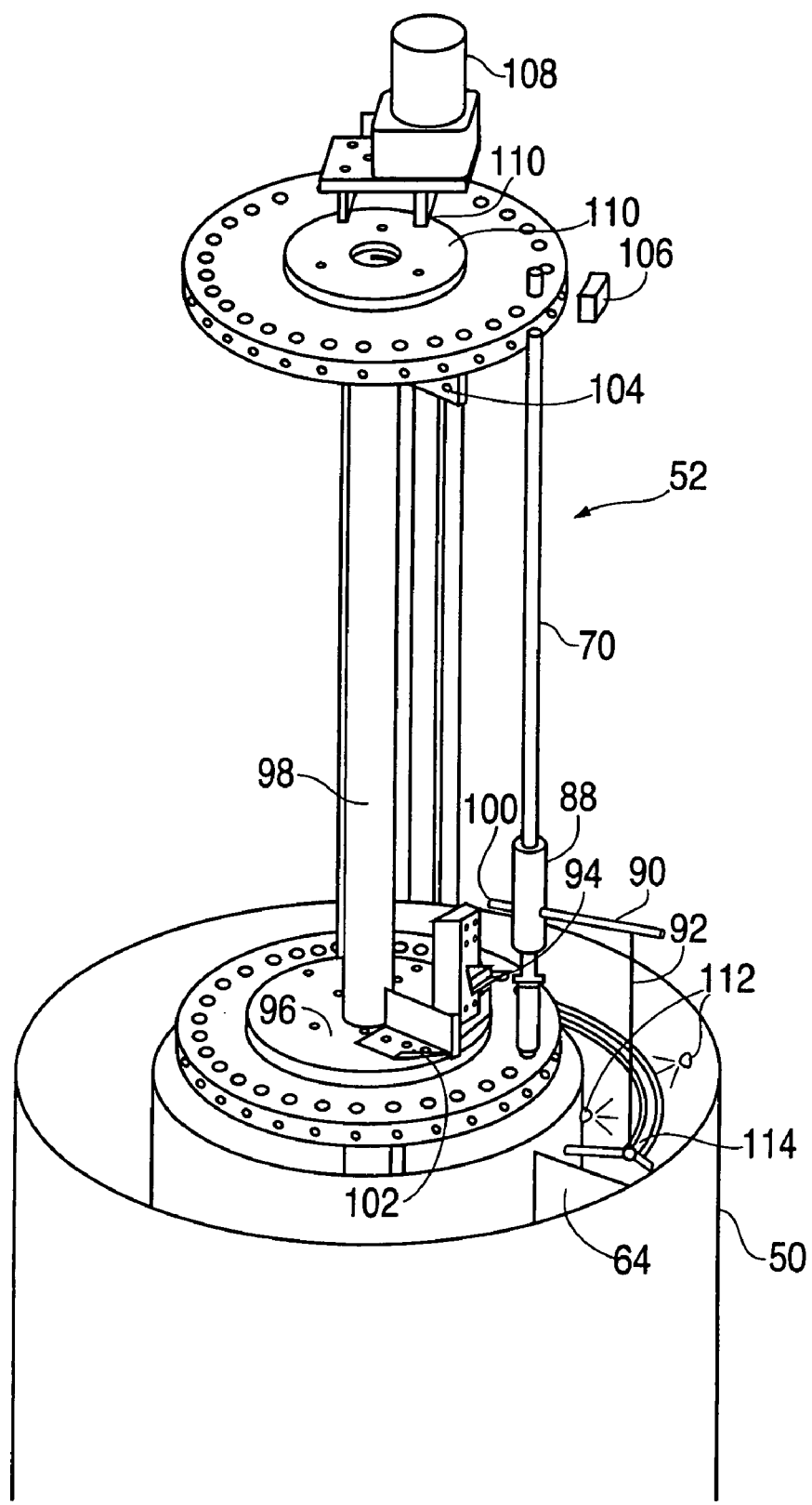
FIG. 3 is a perspective view of a tank and parts rotator assembly according to the system of FIG. 2.

FIG. 3 is a perspective view of the tank 50 and parts rotator assembly 52. As shown in FIG. 3, the rod 70 (one rod shown for clarity) has a part holder slide 88 which is keyed to the rod 70 keeping the rod 70 clocked in position. Extending out from the part holder slide 88 is a horizontal shaft 90 which supports a vertical rod 92. The parts holder 72 attaches to the vertical rod 92 which allows the item 74 to be suspended in the tank 50. As the item 74 rotate through the chemical solution, the item 74 eventually reaches the end of the chemical side 66 of the tank 50 and is moved to the rinse side 68. To progress the item 74 past the tank divider 64, the item 74 is lifted up by an actuator 94. This actuator 94 is disposed on a stationary plate 96. The stationary plate 96 is affixed to a center post 98. In addition, a dowel pin 100 extends inward towards the center of the parts rotator assembly 52 and pierces the part holder slide 88. The dowel pin 100 is further disposed within a longitudinal groove of the rod 70. In this manner, the dowel pin 100 keeps the part holder slide 88 clocked in position.

The parts rotator assembly 52 further includes a plurality of sensors 102-106 configured to sense the position of the item 74. For example, the sensor 102 is configured to sense the rod 70 is in position to be raised. In this manner and/or in response to a cycle time having elapsed, the actuator 94 is controlled to raise the item 74 via the part holder slide 88. The sensor 104 is configured to sense the actuator 94 at a relatively high point in the travel of the actuator 94 and forward signals to the control system 54. In this manner, it is determined that the item 74 has been raised above the tank divider 64 and may advance to the rinse side 68. The sensor 106 is configured to sense when the rod 70 has advanced sufficiently to position the item 74 over the rinse side 68. In this manner, it is determined that the item 74 may be lowered into the rinse side 68 by the actuator 94. The sensor 102 is further configured to sense the part holder slide 88 is at a relative low point in its travel and forward signals to the control system 54. In this manner, the control system 54 is apprised of when to reset a cycle timer. To advance the parts rotator assembly 52, a drive motor 108 is configured to respond to signals from the control system 54. The drive motor 108 includes a pinion gear 110 configured to mesh with a pinion gear 110.

Figure 4:
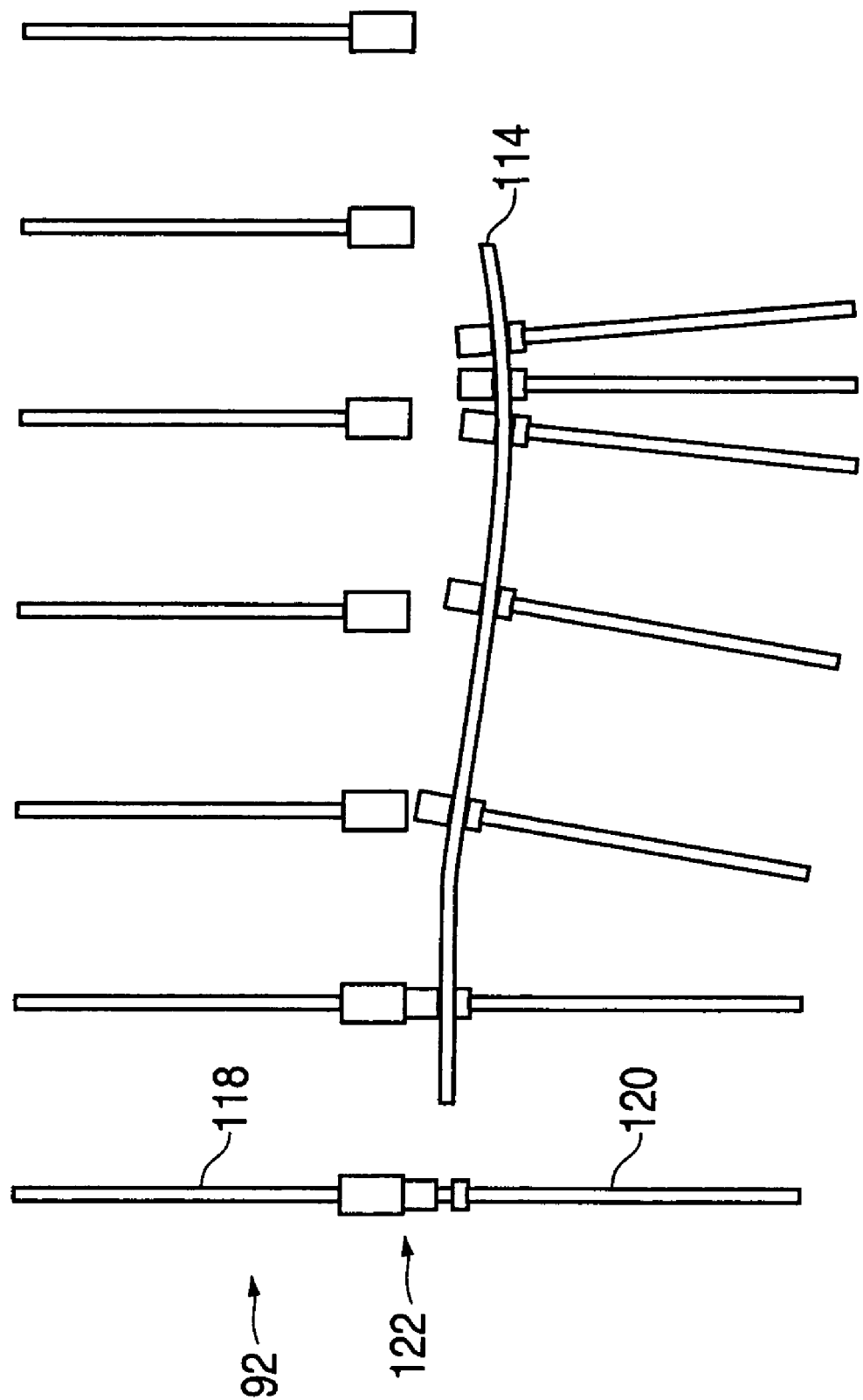
FIG. 4 is a detailed view of a rinse rack according to the system of FIG. 2.

To rinse the item 74, a plurality of spray nozzles 112 are disposed within the rinse side 68 and configured to spray rinse fluid upon the item 74. The rinse side 68 further includes a rinse rack 114. As shown in FIG. 3, the rinse rack 114 forms a channel to urge the vertical rod 92 along a prescribed path. As shown in FIG. 4, the rinse rack 114 includes a downward curve. This downward curve facilitates detaching an upper arm 118 of the vertical rod 92 from a lower arm 120 of the vertical rod 92. In this regard, the upper arm 118 and the lower arm 120 are detachably connectable via a magnetic coupling 122 or other such coupling device. To facilitate retaining the lower arm 120 on the rinse rack 114, the rinse rack 114 includes an upward curvature. In this manner, rinsed items 74 are retained on the rinse rack 114 until being removed. It is an advantage of embodiments of the invention that the configuration of the rinse rack 114 facilitates removal of the items 74 in a first in, first out manner.

Figure 5:
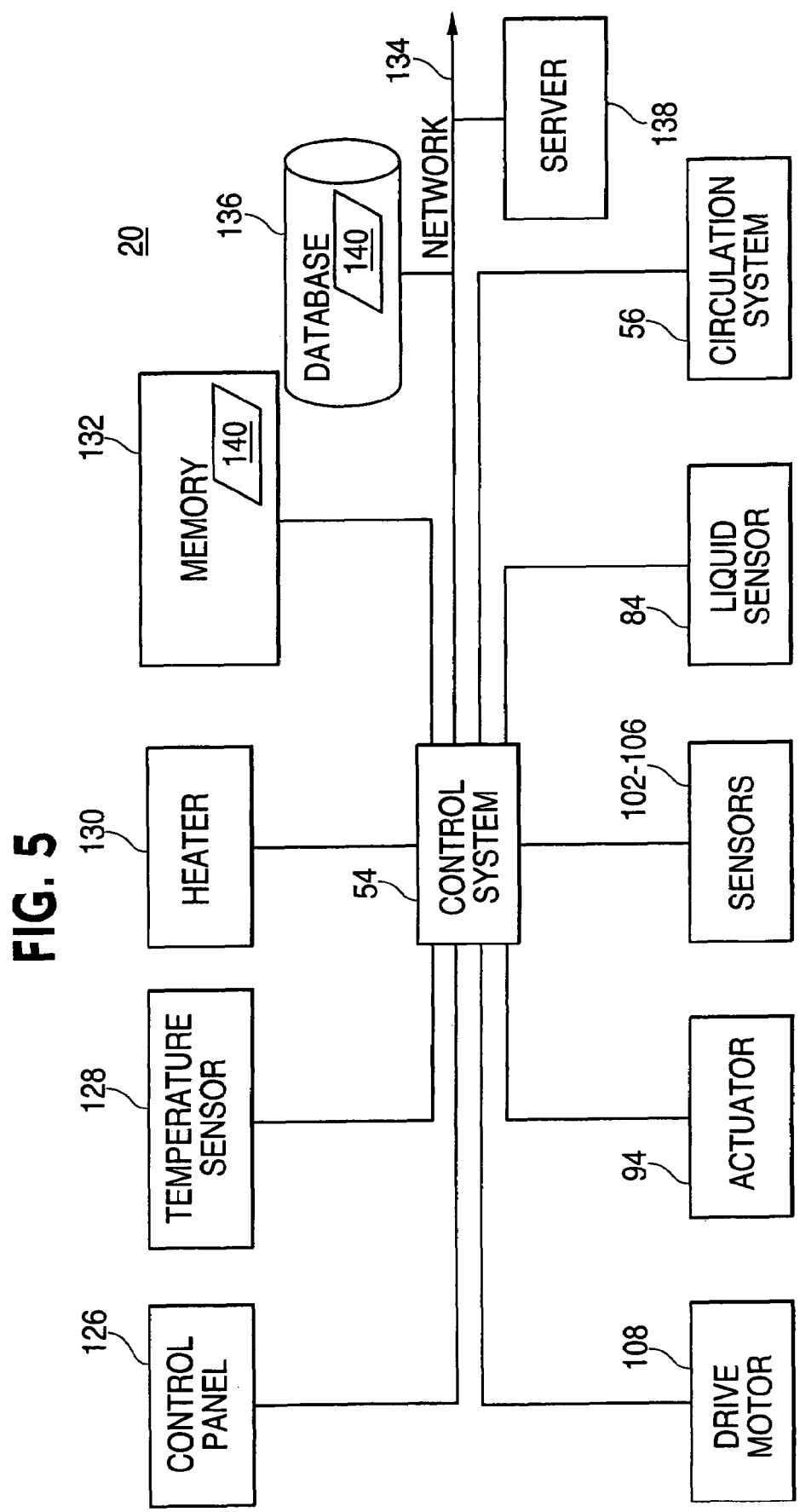
FIG. 5 is a diagram of a system architecture for the chemical processing system according to the system of FIG. 2.

FIG. 5 is a system architecture for the chemical processing system 20 according to an embodiment of the invention. As shown in FIG. 5, the control system 54 is configured to modulate the actuator 94 and drive motor 108. The control system 54 is further configured to intercommunicate with the sensors 102-106, liquid sensor 84, and circulation system 56. In addition, the control system 54 is configured to intercommunicate with a control panel 126, temperature sensor 128, heater 130, and a memory 132. The memory 132 is configured to store data received from the control system 54. For example, the memory 132 may store sensor readings, dates, items processed, and the like. The control panel 126 is configured to provide visual information to a user and accept input from the user. For example, the control panel 126 may include start and stop switches, alarms, temperature and time set points adjustments and display and the like.

Furthermore, in various embodiments of the invention, the chemical processing system 20 may include a network 134 configured to intercommunicate with the control system 54. The network 134 may include, for example, a database 136, server 138, and a multitude of other networked devices. In this regard, the network 134 may include a local area network (LAN), wide area network (WAN), wireless network, the Internet, and the like.

Moreover, the chemical processing system 20 may include at least one table 140. This table 140 may be stored to the memory 132 and/or the database 136. The table 140 may be configured to store data relating to chemically processing one or more items. In addition, the table 140 may include data related to operational parameters of the chemical processing system 20. For example, data stored to the table 140 may include sensor readings, set temperatures, flow rates, and the like. This data may be stored to the table 140 in the form of one or more entries, for example.

Figure 6:
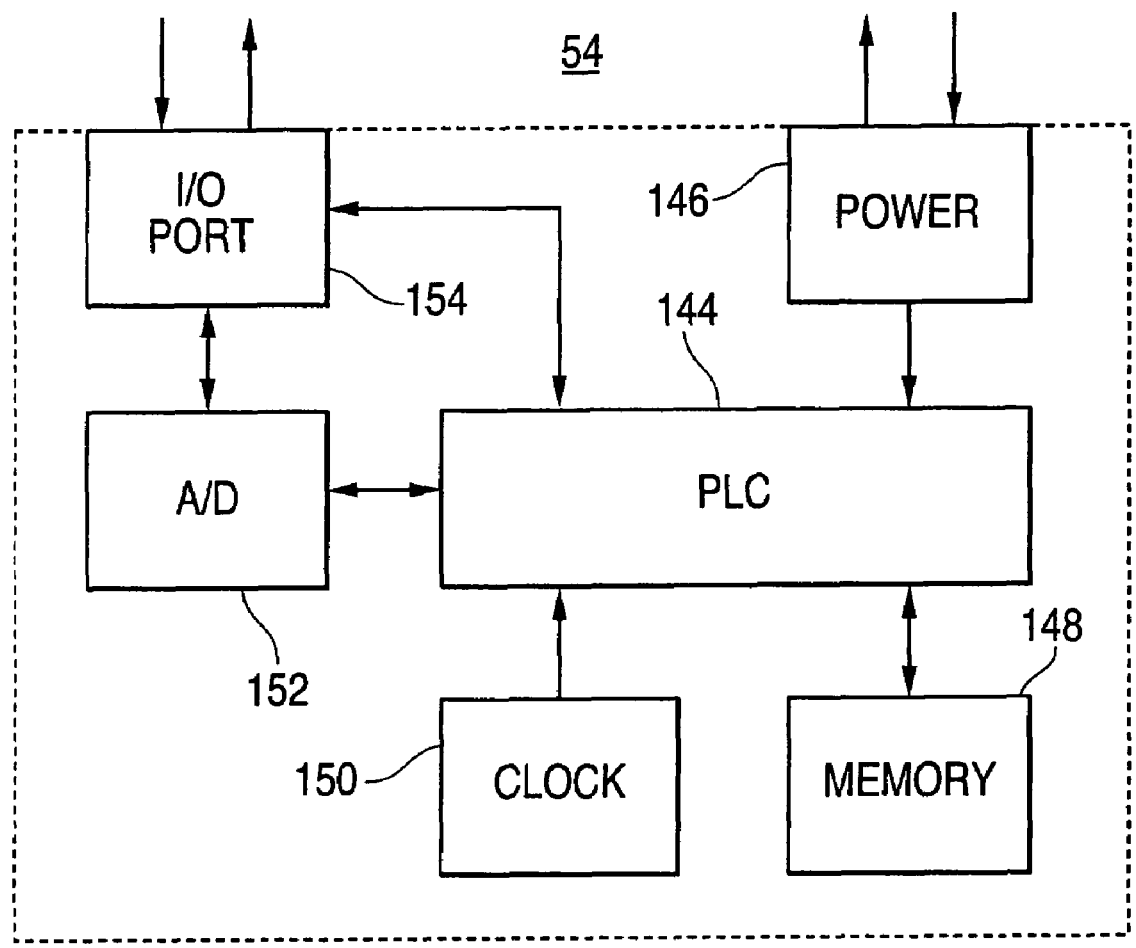
FIG. 6 is a diagram of a system architecture for the control system suitable for use in the system of FIG. 2.

FIG. 6 is a system architecture for the control system 54 suitable for use in the chemical processing system 20 according to FIGS. 1 and 2. As shown in FIG. 6, the control system 54 includes a programmable logic controller ("PLC") 144. This PLC 144 is operably connected to a power supply 146, memory 148, clock 150, analog to digital converter (A/D) 152, and an input/output (I/O) port 154. The I/O port 154 is configured to receive signals from any suitably attached electronic device and forward these signals to the A/D 152 and/or the PLC 144. For example, the I/O port 154 may receive signals associated with temperature from the temperature sensor 128 and forward the signals to the PLC 144. If the signals are in analog format, the signals may proceed via the A/D 152. In this regard, the A/D 152 is configured to receive analog format signals and convert these signals into corresponding digital format signals. Conversely, the A/D 152 is configured to receive digital format signals from the PLC 144, convert these signals to analog format, and forward the analog signals to the I/O port 154. In this manner, electronic devices configured to receive analog signals may intercommunicate with the PLC 144.

The PLC 144 is configured to receive and transmit signals to and from the A/D 152 and/or the I/O port 154. The PLC 144 is further configured to receive time signals from the clock 150. In addition, the PLC 144 is configured to store and retrieve electronic data to and from the memory 148. Furthermore, the PLC 144 is configured to determine signals operable to modulate and thereby control the actuator 94, drive motor 108, circulation system 56, heater 130, control panel 126, and various other suitable components.

In a particular example according to an embodiment of the invention, the PLC 144 is configured to determine when it is appropriate to raise and lower the actuator 94 and advance the parts rotator assembly 52 based upon signals received from the sensors 102-106. For example, the PLC 144 may control the actuator 94 to lift the part holder slide 88 in response to signals from the sensor 102 and/or a completion of a cycle time. In this regard, the item 74 may be subjected to the chemical process for a predetermined amount of time or cycle time. This cycle time is stored to the table 140. In response to the cycle time having elapsed, it may be determined that the item 74 is to be advanced to the rinse side 68.

According to an embodiment of the invention, the PLC 144 and the containment system 58 work in conjunction to facilitate retention of the chemicals within and proper function of the chemical processing system 20. In particular, and as described herein, the chemical processing system 20 includes a variety of sensors which feed information to the PLC 144 which in turn either shuts the unit down, or sets an alarm to warn the operator a malfunction has occurred.

A first feature of the chemical processing system 20 is temperature control. The temperature of the chemical is monitored by the temperature sensor 128. Set points, high and low limits are set in the PLC 144. When the chemical processing system 20 is turned on, the PLC 144 turns the heater 130 on if the chemical temperature is below the set point. If the unit is below the set point, the PLC 144 will not allow the parts rotator assembly 52 to operate and sets an alarm. This prevents an operator from processing the items 74 in a piece of equipment not operating at temperature specifications. If the high limit is reached indicating the temperature is over the high limit the PLC 144 will set an alarm on the control panel 126 indicating to the operator the unit is over temperature.

A second feature of the chemical processing system 20 is flow control. There is a circulation pump in the circulation system 56 which circulates the chemical solution. This serves two purposes; one, to move the chemical fluid through a heat exchanger so it can be elevated to the proper temperature, and two, to keep the chemical mixed properly. There is a flow control sensor in an output line between the heat exchanger and the tank 50. If for any reason the circulating pump quits working the flow control sensor will send a signal to the PLC 144 which in turn will set an alarm on the control panel 126 the operator can see and also power off the heater 130 in the heat exchanger to prevent it from over heating.

A third feature of the chemical processing system 20 is the liquid level control. This prevents the level of the tank 50 from becoming too full. A level control valve is disposed in the tank 50 at a specified height the level is to be at. When the liquid level becomes low, a signal is sent to the PLC 144 from the level control valve which opens a main water valve which allows water to enter the tank 50 bringing it up to proper level. When the proper level is reached the input signal from the level control valve is stopped thus allowing the PLC 144 to shut the main water valve.

If the PLC 144 is receiving an input from the level control valve indicating chemical level is low it will also prevent the heater 130 from turning on. This prevents the heat exchanger from becoming too hot if by chance there is no chemical in the tank 50.

A fourth feature of the chemical processing system 20 is fume control. This feature is to prevent undesirable fumes from affecting the operator or other personnel in the area. This is accomplished by enclosing the entire tank 50 with Plexiglas™ and an exhaust fan duct to the chemical processing system 20. There is a door on the front of the chemical processing system 20 which allows the operator to open it when processing the items 74. When the door is open the exhaust fan pulls air in through the door opening, across the tank 50 into the exhaust fan duct, carrying out chemical fumes. This prevents the operator from becoming in contact with undesirable fumes.

A fifth feature of the chemical processing system 20 is secondary containment. Secondary containment is advantageous in case the tank 50 develops a leak allowing chemical to spill out onto the floor. Secondary containment will keep the chemical in a confined area to be dealt with by qualified individuals to dispose of the chemical. The secondary containment of the chemical processing system 20 confers at least three advantages of conventional chemical processing systems.

A first advantage of secondary containment is over flow. If for some reason the level control valve should malfunction and allow the main water valve to remain on, the liquid level would reach a height in the tank to allow it to go over the rinse tank divider 64 which is below the top of the tank 50 sides. There is a drain in the bottom of the rinse side 30 which connects to industrial waste, allowing the chemical to go directly to industrial waste.

A second advantage of secondary containment is to contain the chemical in a confined area until it can be dealt with by qualified personnel. This is accomplished by providing an area under the tank 50 which has the capacity to hold the entire contents of the tank 50. Basically the tank 50 is within a tank. A cart which holds all of the provisions to operate the chemical processing system 20 and allow it to be mobile also provides a sealed area under the tank 50 which has sides on it.

A third advantage of secondary containment is inform the operator there is a leak in the tank 50 and prevent the main water valve from opening. This is accomplished by the sump 82 in the sealed secondary containment area under the tank 50. In this sump 82 there is a second liquid level sensor 84. If a leak occurs the chemical will run to the sump 82 due the angle of the floor is in the bottom the sealed secondary containment area. It is designed to allow liquid to go to the sump 82 first. Once the liquid becomes high enough in the sump 82 the second liquid level sensor 84 sends a signal to the PLC 144 which in turn shuts off the main water valve, sets an alarm on the control panel 126 the operator can see, shuts off movement of the parts rotator assembly 52, and turns on a sump pump. The sump pump is connected to the industrial waste line which allows the spilled chemical to go directly to industrial waste eliminating a clean up by qualified personnel and keeps operators from becoming harmed from the chemical.

In the following description of FIG. 7, a method of utilizing the chemical processing system 20 is provided. According to various embodiments of the invention, the chemical processing system 20 adheres to a principle of "single piece workflow." That is, although there are several pieces in the process at any one time, a completed piece occurs every minute, for example. In conventional batch processing method, several pieces are completed at the same time every 30 minutes.

Figure 7:
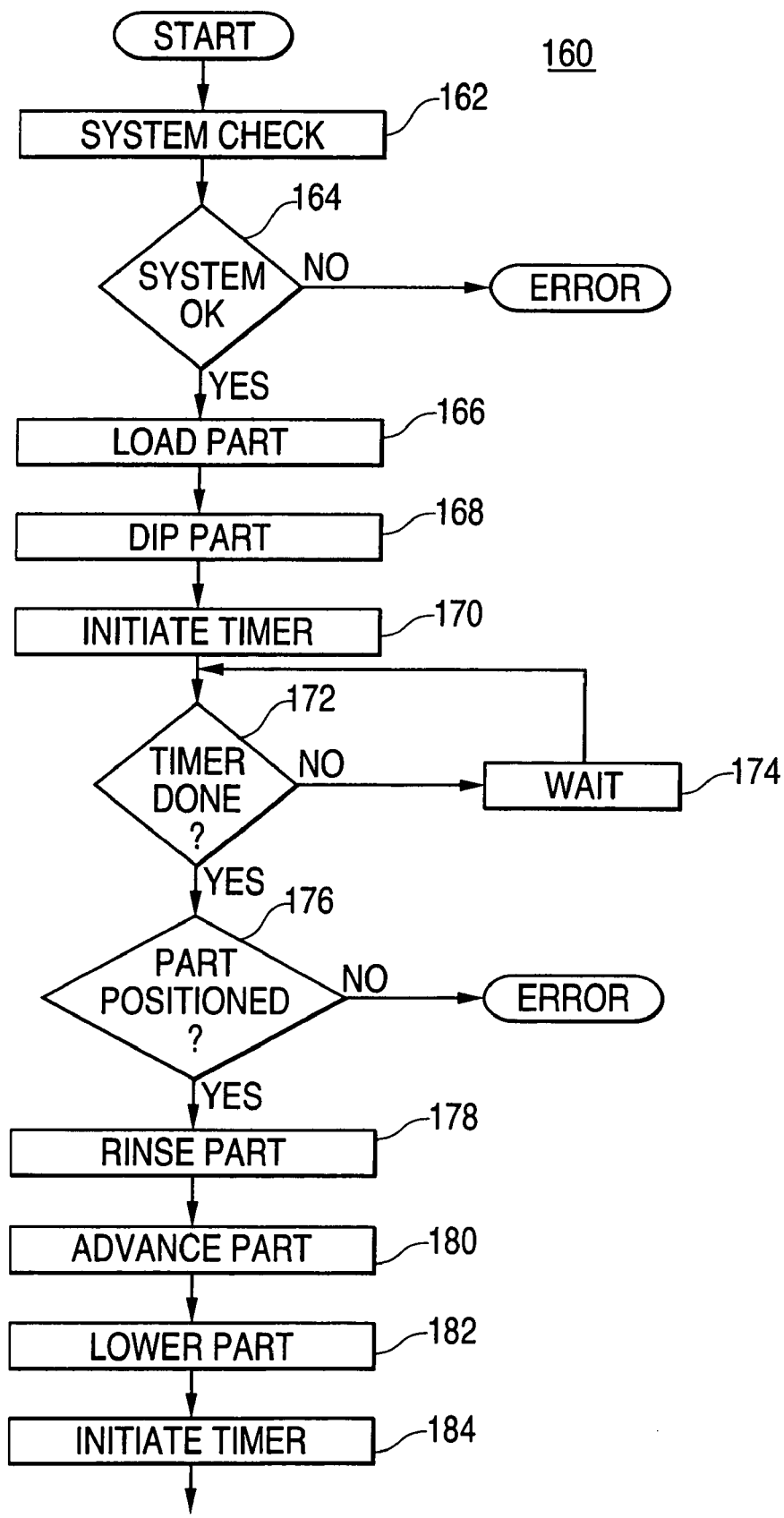
FIG. 7 is a flow diagram of a method of use according to the system of FIG. 2.

FIG. 7 is a flow diagram of a method 160 according to an embodiment of the invention. In the following description, the operation of one chemical processing system 20 is described. However, in other embodiments, 2 or more chemical processing systems 20 may operate. In this regard, certain chemical processes include a cleaning/degreasing, etching, and plating step with a rinse step following each chemical step. To perform such a chemical process, it may be advantageous to include three of the chemical processing systems 20. Following the cleaning/degreasing and rinse steps in a first chemical processing system 20, the item 74 is etched/deoxidized and rinsed in a second chemical processing system 20. Subsequently, the item 74 is plated and rinsed in a third chemical processing system 20.

As shown in FIG. 7, the method 160 is initiated in response to turning on the chemical processing system 20 and performing a system check at step 162. The system check encompasses any suitable number of diagnostic subroutines, calibrations, and the like. For example, at step 162, signals may be sent and received by the PLC 144 via the I/O port 154. In other examples, the control panel 126 may be powered, circulation system may be powered and controlled to initiate flow. In addition, in response to signals from the temperature sensor 128, the control system 54 may modulate the heater 130 to raise the temperature of circulating fluids.

At step 164, it is determined whether the system is functioning within a predefined normal set of parameters. If it is determined that one or more parameters are outside the predetermined normal set of parameters, it is determined that an error exists. Depending upon the error, a variety of responses may be performed. For example, if it is determined that the circulating fluid is below a predetermined minimum temperature, the control system 54 may determine the proper response is to continue heating the circulating fluid and turn on a low temperature warning light on the control panel 126. The control system 54 may further determine to inactivate the drive motor 108 to substantially prevent the items 74 from being chemically processed in the low temperature fluids. In another example, a current measured across the drive motor 108 may exceed a predetermined high current condition and the control system 54 may determine to display an indicator of the failure and otherwise shut down the chemical processing system 20. These responses may be determined based upon a set of computer readable instructions stored to the memory 148. These instructions may be included in the table 140 or another such computer readable file. If it is determined that the chemical processing system 20 is operating within the predetermined normal set of parameters, the item 74 is loaded at step 166.

At step 166, the item 74 is loaded on to the part holder 72. In an embodiment, the item 74 is loaded automatically. However, in another embodiment, the item 74 is loaded by an operator.

At step 168, the item 74 is dipped in the chemical side 66. For example, the operator, grasping the lower arm 120 may dip the item 74 into the chemical side 66 and attach the lower arm 120 to the upper arm 118. In other embodiments, the item 74 is dipped into the chemical side 66 automatically by an actuator such as the actuator 94. In addition, following the step 168, the item 74 is advanced through the chemical side 66.

According to various embodiments, the parts rotator assembly 52 operates in a substantially continuous manner.

That is, the parts rotator assembly 52 rotates at a substantially constant rate. The rate is based on a predetermined dip time and a chemical tank distance as measured from a start area of the chemical side 66 to the end of the chemical side 66. In a particular example, if the predetermined dip time is 2 minutes and the chemical tank distance is 2 meters, then the rate is determined to be 1 meter per minute. The predetermined dip time is based on a variety of factors. These factors include one or more of the following: chemical solution manufacturers suggested dip time, item surface area, age of chemical solution, number of items treated by solution, solution temperature, flow rate of circulating fluids, and the like.

At step 170, a cycle timer is initiated. For example, in response to a signal from a sensor, such as the sensors 102-106, the cycle timer is initiated.

At step 172, it is determined whether the cycle timer has elapsed. For example, the clock 150 is polled by the PLC 144. In response to an insufficient amount of time, the PLC 144 may wait at step 174. Following the step 174, the PLC 144 may poll the clock 150 again. In response to the cycle timer elapsing, it is determined if the item 74 is in position.

At step 176, it is determined whether the item 74 is in position to be raised by the actuator 94. For example, in response to signals from the sensor 102, the PLC 144 determines if the part holder slide 88 is disposed appropriately. If it is determined that the item 74 is not in position to be raised, an error state may result. If it is determined that the item 74 is in position then, at step 178, the item 74 is raised.

At step 178, the item 74 is raised by the actuator 94 so that the item 74 may clear the tank divider 64 and be rinsed in the rinse side 68. For example, the PLC 144 sends a signal via the I/O port 154 to modulate the actuator 94. In response to these signals, the actuator 94 is controlled to raise the item 74. The actuator 36 is further controlled to continue raising the item 74 until the item 74 reaches an adequate height. For example, the actuator 94 may continue to raise the item 74 until the actuator 94 has achieved a top limit. In another example, in response to signals from a sensor, such as the sensor 104, the PLC 144 determines that the item 74 has risen to an adequate height.

At step 180, the item 74 is advanced. For example, in response to signals from the sensor 104, the PLC 144 sends signals via the I/O port 154 to modulate the drive motor 108 or a motor drive controller associated with the drive motor 108. In response to the signals from the PLC 144, the drive motor 108 is controlled to advance the parts rotator assembly 52.

At step 182, the item 74 is lowered. For example, in response to signals from the sensor 106, the PLC 144 determines the item 74 has advanced sufficiently to be lowered. In response, the PLC 144 sends signals to the actuator 94 to lower the item 74 into the rinse side 68.

At step 184, the cycle timer is initiated. In this manner, it may be determined when to raise the next item 74 from the chemical side 66. Following the step 184, the item 74, suspended by the lower arm 120, is advanced along the rinse rack 114. As the rinse rack 114 slants downward, a point is eventually reached at which time the upper arm 118 is disengaged from the lower arm 120. At such point, the item 74 comes to rest suspended from the rinse rack 114 by the lower arm 120. The upper arm 118, generally continues its advance about the tank 50 due to the action of the parts rotator assembly 52. The item 74 may remain suspended from the rinse rack 114 until such time as it is removed automatically or by the operator. As described herein, it is an advantage of the present invention that the item 74 is processed in a single piece workflow manner. As each process is performed, an opportunity exists to evaluate the item 74. In response to a detected error in the processing of the item 74, the flow of items 74 may be halted until such time as the cause of the problem is identified and corrected. Following the step 184, the item 74 may be dried and/or subjected to further chemical processing as desired. In this regard, following chemical processing at the cleaning unit 38, deoxidation unit 40, and the Alodine 600™ unit 42, the item 74 is dried at the drying station 28.

It is to be noted that the steps for the method 160 need not proceed in the order presented, but rather, may proceed in any suitable order.

Figure 8:
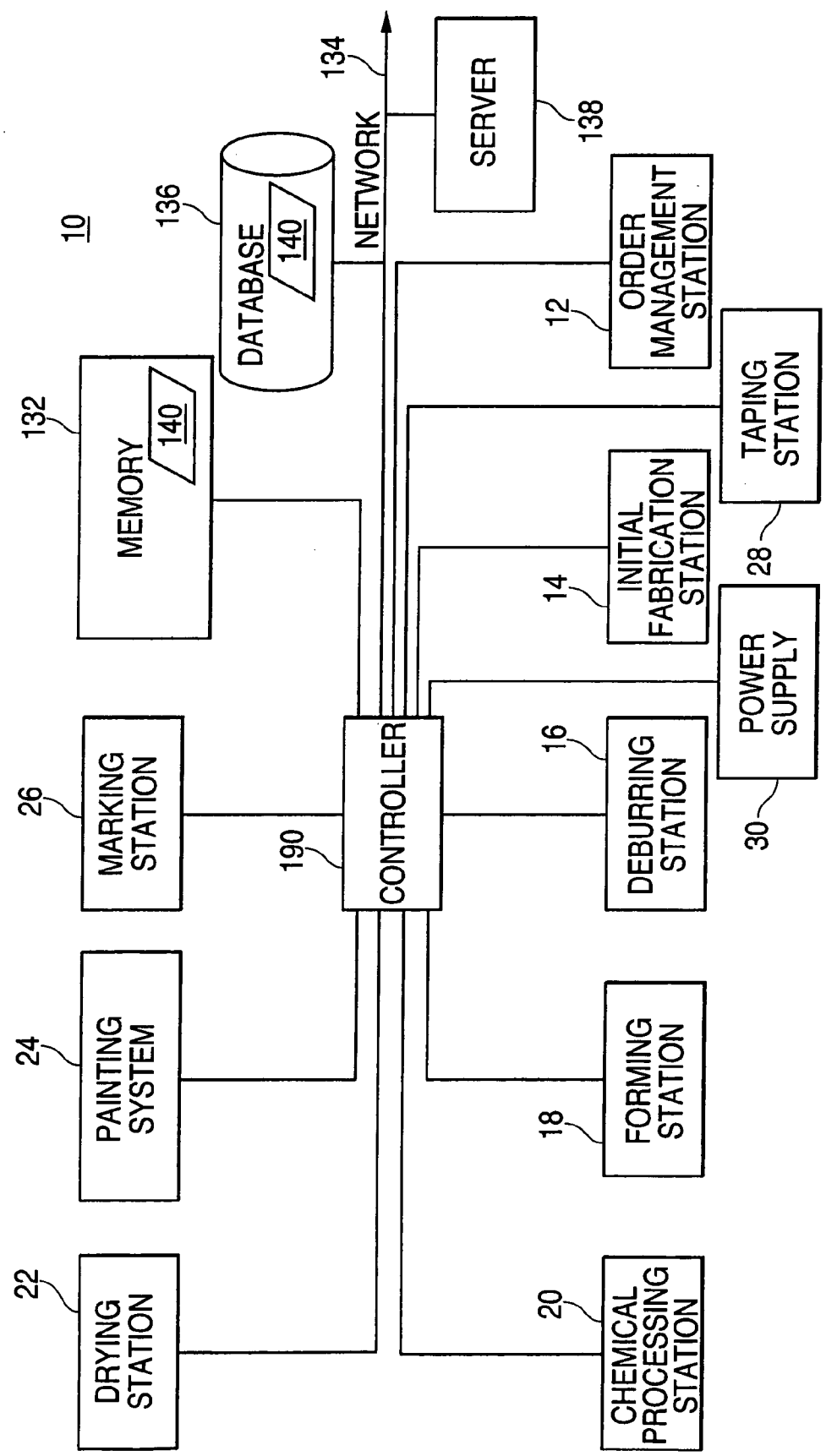
FIG. 8 is a diagram of a system architecture for the manufacturing system according to the system of FIG. 1.

FIG. 8 is a system architecture for the IMS 10 according to FIG. 1. As shown in FIG. 8, the IMS 10 includes a controller 190 configured to communicate with the order management station 12 and the various other stations of the IMS 10. The controller 190 is configured to communicate with the stations of the IMS 10. In particular, the controller 190 is configured to receive signals from the order management system 12 associated with an order for the item 74 and the controller 190 is configured to transmit signals to the stations of the IMS 10 in response to the order. In addition, the controller 190 is configured to intercommunicate with the memory 132. The memory 132 is configured to store data received from the controller 190. For example, the memory 132 may store item orders, sensor readings, dates, items processed, and the like on the table 140.

Furthermore, in various embodiments of the invention, the controller 190 may communicate over the network 134. As described herein, the network 134 may include, for example, the database 136, server 138, and a multitude of other networked devices. In this regard, the network 134 may include a local area network (LAN), wide area network (WAN), wireless network, the Internet, and the like. Moreover, the order management station 12 may receive item orders via the network 134.

In the following description of FIG. 9, an example is made of generating one of the items 74. However, depending upon the order for items received by the IMS 10, any suitable number of the items 74 are generated. In this regard, in orders of two or more of the item 74, the items 74 proceed through the IMS 10 as a single piece flow.

FIG. 9 is a flow diagram of a method 200 of use according to FIG. 1. As shown in FIG. 9, the method 200 is initiated in response to receiving an order for one or more of the items 74. For example, the order management system 12 receives the order via the network 134. In response to this order, a system check is performed at step 204.

At step 204 the system check is performed. The system check encompasses any suitable number of diagnostic subroutines, calibrations, and the like. For example, at step 204, signals may be sent to the various stations of the IMS 10 from the controller 190. In response to these signals, the various stations perform a respective system check and reply to the controller 190 by giving their respective status. In addition, the stations 14-28 optionally determine a respective amount of raw materials present. That is, for example, the initial fabrication stations determines an amount of sheet materials present and the painting system 24 determines the amount of paint present. These respective present amounts are compared to a number of the items 74 ordered and an amount of materials per item 74 to determine if sufficient raw materials are present to complete the received order.

At step 206 it is determined if the IMS 10 passes the system check. For example, if a station does not pass its respective system check or insufficient materials are present, it is determined that the IMS 10 does not pass the system check and an error is generated to notify the operator. The particular error response may be determined based upon a set of computer readable instructions stored to the memory 132. These instructions may be included in the table 140 or another such computer readable file. If it is determined that the IMS 10 is operating within the predetermined normal set of parameters, the item 74 is initially fabricated at step 208.

At step 208, the item 74 is initially formed. For example, the decoiling unit 32 is modulated by the controller 190 to essentially straighten raw materials supplied in roll form. The feed unit 34 is modulated by the controller 190 to align and urge the stock into the punch/trim unit 36 via the action of, for example, a pair of powered rollers controlled to grasp the stock and feed it from the decoiling unit 32 to the punch/trim unit 36. In addition, the punch/trim unit 36 is modulated by the controller 190 to cut out the item 74 from the stock. It is to be understood that the modulation of the various stations at step 208 and throughout the method 200 may be direct and/or indirect. That is, the controller 190 may be configured to generate a specific set of motor/actuator control commands and forward these commands to the respective stations. In another example, based on a command by the controller 190, a station controller similar to the control system 54 is configured to generate the specific set of motor/actuator controls.

Following the step 208, the item 74 is moved to the deburring station 16. In an embodiment, the item 74 is moved manually. For example, the operator takes the item 74 from the initial forming station 14 and delivers it to the deburring station 16. It is an advantage of this embodiment that the operator is provided the opportunity to inspect the item 74 at each step of the process. In an embodiment, the item 74 is moved automatically. For example, a conveyer or other such device is controlled to take the item 74 from the initial forming station 14 to the deburring station 16. It is an advantage of this embodiment that the item 74 is processed with minimal interaction required by the operator. In addition, between each of the stations, the item 74 is transported manually and/or automatically.

At step 210, in response to the initial forming, the item 74 is deburred. For example, the deburring station 16 is controlled to remove burrs or wire edges formed by the punching/trimming process from the item 74.

At step 212 the item 74 is formed in response to the deburring step. For example, the forming station 18 is modulated by the controller 190 to bend and/or join the item 74 as appropriate.

At step 212 the item 74 is chemically processed in response to the forming step. For example, the chemical processing system 20 is modulated by the controller 190 to chemically alter or process at least a surface portion of the item 74. A more detailed description of the chemical processing steps are provided herein. Following the processing step, the item 74 is dried. For example, the drying station 22 is modulated by the controller 190 to evaporate or dry liquids such as water and/or rinse solution on the item 74.

At step 212 the item 74 is painted in response to the processing step. For example, the painting unit 44 is modulated by the controller 190 to coat the item 74 with paint.

At step 212 the item 74 is marked in response to the painting step. For example, the marking station 26 is modulated by the controller 190 to label the item 74.

At step 212 the item 74 is taped in response to the marking step. For example, the taping station 28 is modulated by the controller 190 to apply sound deadening tape upon the item 74.

It is to be noted that the steps for the method 200 need not proceed in the order presented, but rather, may proceed in any suitable order.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for manufacturing a finished item from raw material, the system comprising:

a first forming station to form the item from a supply of the raw material, wherein the first forming station comprises: a decoiling unit to unroll the supply of material; a punch/trim unit to cut the item from the supply of material; and a feed unit to urge the supply of material into the punch/trim unit from the decoiling unit;

a chemical processing system including at least one chemical processing system unit to chemically alter a surface of the item, the chemical processing system comprising:

a tank including a chemical side and a rinse side, the chemical side including chemical solution, the rinse side including a sprayer to spray a rinse solution on the item and a rinse rack positioned in the tank;

a parts rotator assembly and a plurality of part holders supported thereon to move relative to the tank, each part holder holding the item such that the item moves relative to the tank, each part holder including a lower arm which is separable from the remainder of the part holder and the lower arm is detached from the remainder of the part holder as it moves alone a portion of the rinse rack in the rinse side of the tank;

a circulation system to circulate fluid in the tank; and a control system to receive signals from at least one sensor in communication with the chemical processing system and modulate the system for manufacturing the item in response to the signals; and a finishing station to apply a finish to the item.

2. The system according to claim 1, wherein the at least one chemical processing system unit comprises:

a cleaning unit to remove residue from the item;

a deoxidizing unit to prepare the item for a subsequent chemical process; and a chemical coating unit to apply a chemical coat to the item.

3. The system according to claim 1, wherein the finishing station further comprises:

a painting unit to apply paint on the item;

a curing oven to fix the paint to the item; and a cooling unit to cool the item.

* * * * *